(12) United States Patent
Whiffen (10) Patent No.: US 10,238,141 B2
(45) Date of Patent: Mar. 26, 2019

(54) CAPSULE FORMATION

(75) Inventor: Robert Seon Whiffen, London (GB)

(73) Assignee: BRITISH AMERICAN TOBACCO (INVESTMENTS) LIMITED, London (GB)

( * ) Notice: Subject to any disclaimer, the term of this patent is extended or adjusted under 35 U.S.C. 154(b) by 800 days.

(21) Appl. No.: 14/237,813

(22) PCT Filed: Jul. 27, 2012

(86) PCT No.: PCT/EP2012/064782
§ 371 (c)(1),
(2), (4) Date: Feb. 27, 2014

(87) PCT Pub. No.: WO2013/020834
PCT Pub. Date: Feb. 14, 2013

(65) Prior Publication Data
US 2014/0178580 A1 Jun. 26, 2014

(30) Foreign Application Priority Data
Aug. 10, 2011 (GB) .................................. 1113775.9

(51) Int. Cl.
| | |
|---|---|
| *A24D 3/04* | (2006.01) |
| *A24B 15/28* | (2006.01) |
| *A24D 3/06* | (2006.01) |
| *B01J 13/04* | (2006.01) |
| *A23P 10/30* | (2016.01) |

(52) U.S. Cl.
CPC .............. *A24D 3/048* (2013.01); *A23P 10/30* (2016.08); *A24B 15/283* (2013.01); *A24D 3/061* (2013.01); *B01J 13/04* (2013.01)

(58) Field of Classification Search
CPC ....... A23P 10/30; A24B 15/283; A24D 3/048; A24D 3/061; B01J 13/04
USPC ........................... 427/212; 118/69, 428, 429
See application file for complete search history.

(56) References Cited

U.S. PATENT DOCUMENTS

| | | | |
|---|---|---|---|
| 2,911,672 A | * | 11/1959 | Van Erven Dorens ... A61J 3/07 264/4 |
| 4,154,379 A | | 5/1979 | Schermutzki |
| 4,251,195 A | | 2/1981 | Suzuki et al. |
| 4,422,985 A | | 12/1983 | Morishita et al. |
| 5,236,466 A | | 8/1993 | Lauterbach |
| 5,888,538 A | | 3/1999 | Kiefer et al. |

(Continued)

FOREIGN PATENT DOCUMENTS

| | | |
|---|---|---|
| EP | 0513563 | 11/1992 |
| EP | 0513603 | 11/1992 |

(Continued)

OTHER PUBLICATIONS

International Searching Authority; Notification of Transmittal of the International Search Report and the Written Opinion of the International Searching Authority; dated Jul. 19, 2013; NL.

*Primary Examiner* — Alexander M Weddle
(74) *Attorney, Agent, or Firm* — Cantor Colburn LLP (57) ABSTRACT

A capsule forming apparatus comprising a plurality of outputs configured to output capsule materials, a tank for housing a first capsule material and being configured to supply the first capsule material to the outputs and at least one conduit being configured to convey a second capsule material to the outputs. A method for forming capsules is also described.

14 Claims, 7 Drawing Sheets

(56) References Cited

U.S. PATENT DOCUMENTS

2006/0233874 A1* 10/2006 Suzuki ................ A61K 9/4816
                                                          424/451
2009/0304788 A1    12/2009 Kim et al.

FOREIGN PATENT DOCUMENTS

| EP | 0525731 | 2/1993 |
| EP | 0919279 | 11/1998 |
| EP | 1275434 | 1/2003 |
| EP | 0778083 | 5/2003 |
| EP | 1362583 | 11/2003 |
| EP | 1764151 | 3/2007 |
| EP | 2080551 | 7/2009 |
| GB | 789844 | 1/1955 |
| GB | 1142708 | 11/1965 |
| JP | 57019032 | 2/1982 |
| JP | 59112833 | 6/1984 |
| JP | 62176536 | 8/1987 |
| JP | 01207126 | 8/1989 |
| JP | 07196478 | 8/1995 |
| JP | 09310943 | 12/1997 |
| JP | 2006288215 | 10/2006 |
| KR | 960009155 | 7/1996 |
| TW | 200827039 | 7/2008 |
| WO | 1996030115 | 10/1996 |
| WO | 1998013133 | 4/1998 |
| WO | 1999003626 | 1/1999 |
| WO | 2002013755 | 2/2002 |
| WO | 0243646 | 6/2002 |
| WO | 2002043646 | 6/2002 |
| WO | 2004050069 | 6/2004 |
| WO | 2007012478 | 2/2007 |
| WO | 2007064580 | 6/2007 |
| WO | 2007071512 | 6/2007 |
| WO | 2008056344 | 5/2008 |
| WO | 2010058661 | 5/2010 |

* cited by examiner

CAPSULE FORMATION

CROSS REFERENCE TO PRIOR APPLICATION

This application is a national stage application filing under 35 U.S.C. § 371 of and claims benefit under 35 USC § 365(c) to PCT/EP2012/064782, filed on Jul. 27, 2012, which claims priority to and benefit of Great Britain Patent Application No. 1113775.9, filed on Aug. 10, 2011, currently pending.

FIELD

The invention relates to the formation of capsules. Particularly, but not exclusively, the invention relates to an apparatus and method for forming capsules with a core encapsulated by a shell. The capsules may be for use in the tobacco industry.

BACKGROUND

As used herein, the term "smoking article" includes any tobacco industry product and includes smokeable products such as cigarettes, cigars and cigarillos whether based on tobacco, tobacco derivatives, expanded tobacco, reconstituted tobacco or tobacco substitutes and also heat-not-burn products.

Capsules can be incorporated into cigarettes and other smoking articles. For example, one or more breakable flavour capsules can be positioned inside the filter of a cigarette to allow a smoker to make a flavour selection before or during smoking. Generally speaking, the capsules are broken by squeezing the filter between finger and thumb to cause a flavour substance which was previously contained within the capsule to be released into the filter.

Equipment used to manufacture capsules for the tobacco industry includes, for example, a dual nozzle through which core material and shell material are fed simultaneously. The core and shell materials are supplied from separate containers, which are exclusively connected to the dual nozzle via separate feeds. A cooling fluid system, also exclusive to the dual nozzle, is used to cool a core/shell combination which exits the nozzles.

The invention provides an improved process and apparatus for manufacturing capsules.

SUMMARY

According to the invention, there is provided a capsule forming apparatus comprising a plurality of outputs configured to output capsule materials; a tank for housing a first capsule material and being configured to supply the first capsule material to the outputs; and at least one conduit being configured to convey a second capsule material to the outputs.

The at least one conduit may extend through the tank.

The at least one conduit may extend from a roof of the tank to a base of the tank through the first capsule material.

The outputs may be located directly beneath the first capsule material in the tank.

The capsule forming apparatus may comprise a vibration unit configured to vibrate the outputs relative to the tank.

The outputs may be located in a base section of the tank and the vibration unit may be configured to vibrate the base section of the tank relative to an upper section of the tank.

The outputs may be located in a support beneath the tank and the vibration unit may be configured to vibrate the support relative to the tank.

The at least one conduit may be flexible to allow an end of the conduit to move with the outputs as they are vibrated.

The vibration unit may comprise a cam configured to vibrate the outputs as the cam rotates.

The capsule materials output by the outputs may comprise droplets having an inner core of one of the first or second capsule materials and an outer shell layer of the other of the first or second capsule materials.

The capsule forming apparatus may further comprise a fluid stream into which the outputs are configured to output the capsule materials.

The capsule forming apparatus may comprise a fluid director configured to direct the capsule materials along a spiral path in the fluid stream.

The fluid stream may comprise a looped system through which the fluid is driven to and from the outputs.

The capsule forming apparatus may further comprise a cooling unit configured to cool the fluid stream to a temperature sufficiently low to solidify at least one of the capsule materials.

The capsule forming apparatus may comprise a tank for housing the second capsule material located above the tank for housing the first capsule material, and the at least one conduit may extend between an output of the tank for housing the second capsule material and the plurality of outputs.

Each of the plurality of outputs may comprise a nozzle pair comprising a first nozzle configured to output the first capsule material and a second nozzle substantially concentric with the first nozzle configured to output the second capsule material.

The first capsule material may be liquid shell material and the second capsule material may be liquid core material.

The apparatus may comprise a plurality of said conduits, wherein one conduit is provided per output.

Each individual conduit may be configured to convey the second capsule material to a single one of the plurality of outputs.

According to the invention, there may be provided a method of forming capsules comprising supplying a first capsule material to a plurality of outputs from a tank; and supplying a second capsule material to the plurality of outputs from at least one conduit which extends through the tank.

According to the invention, there may be provided a capsule formed according to the method defined above.

According to the invention, there may be provided a smoking article comprising a capsule formed according to the method defined above.

For the purposes of example only, embodiments of the invention will now be described with reference to the accompanying figures in which:

DETAILED DESCRIPTION

Figure 1:
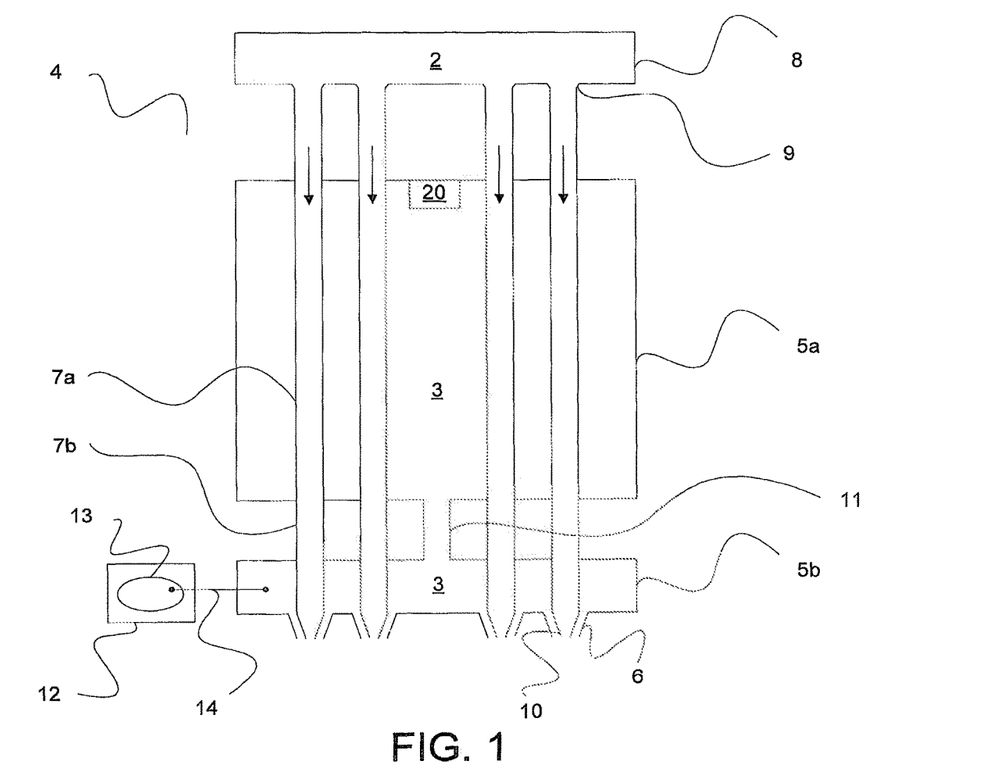
FIG. 1 is an illustration of a capsule forming apparatus in which tubes for core material extend through a vibratable tank of shell material to a concentric nozzle arrangement at the base of the tank.

An apparatus for forming a capsule 1 which is suitable for incorporating into a cigarette or other smoking article is shown in FIG. 1.

Figure 2:
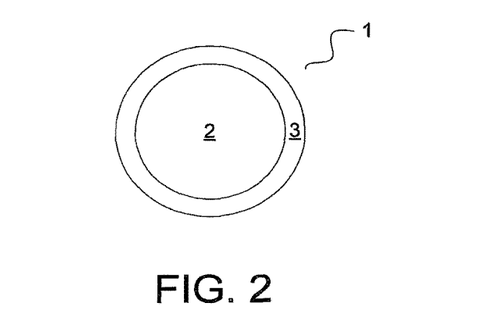
FIG. 2 is a schematic illustration of a substantially spherical capsule comprising a core surrounded by a shell.

The following description generally refers to a capsule 1 having a substantially spherical core 2 and a substantially spherical shell 3 which encapsulates the core 2. An example of the capsule 1 is illustrated in FIG. 2. However, as will be explained below, other shapes of capsule 1 can also be produced. In terms of size, the core 2 will generally have a diameter in the range of between approximately 0.5 mm and approximately 5 mm. An example diameter is 3.3 mm. The shell 3 will generally have a thickness of between approximately 0.01 mm and approximately 1 mm. An example thickness is 0.1 mm. It should be understood, however, that the invention is not limited to forming capsules 1 with cores 2 and shells 3 within these size ranges. Capsules 1 with cores 2 and/or shells 3 with sizes which are bigger or smaller than those given above can also be formed. As will be explained below, the core material 2 may be volatile and may be formulated to include a flavour compound such as menthol. One skilled in the art will appreciate that a variety of different flavours could be formulated to be included in a suitable core material 2. The flavour contained in the capsules 1 is released at a required time, for example when the shell 3 of the capsule 1 is perforated or crushed.

The apparatus 4 for forming capsules 1 comprises a tank 5, such as an IBC or other suitable container, in which liquid shell material 3 can be contained. At the base of the tank 5 are a plurality of outputs through which the liquid shell material 3 can exit the tank 5. The outputs may each comprise a nozzle 6 and will be discussed below in this context. These nozzles 6 will be referred to below as shell liquid nozzles 6 and may be integrated into the base of the tank 5. Shell liquid 3 can flow directly from the main body of the tank 5 into the shell liquid nozzles 6 under gravity.

The apparatus 4 also comprises a plurality of conduits 7, for example flexible hoses 7, through which liquid core material 2 can flow from a core material reservoir 8. The core material reservoir 8 may, for example, comprise another tank such as the manifold 8 shown in FIG. 1. As can be seen, in FIG. 1, the manifold 8 comprises a plurality of outlets 9 from which the conduits 7 extend towards the tank 5 of shell material 3. The conduits 7 are sealed to the outlets 9 so that leakage of the core material 2 at the join between the conduits 7 and the outlets 9 is prevented.

At the opposite end of each conduit 7 to the core material manifold 8 is one of the outputs referred to above. In addition to the shell material nozzles 6 previously mentioned, each output may comprise a core material nozzle 10 such as the nozzles 10 shown in FIG. 1. Optionally, a separate conduit 7 is provided for each output so that the apparatus 4 comprises one conduit 7 per core material nozzle.

Figure 4:
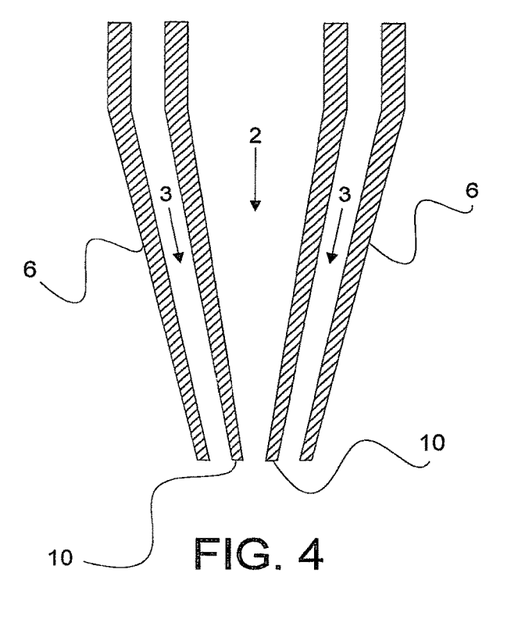
FIG. 4 is an illustration of a pair of concentric nozzles for outputting liquid core and shell material.

Each core material nozzle 10 is located at the base of the tank 5 of shell liquid and fits inside one of the shell liquid nozzles 6 so that a nozzle pair is created 6, 10. Optionally, as shown in FIG. 4, the core and shell liquid nozzles 10, 6 of each nozzle pair are concentric with one another. The diameter of the exit of the core nozzle 10 may be smaller than that of the shell nozzle 6. The core material nozzles 10 can be integrated into the base of the shell material tank 5 in a similar fashion to the shell material nozzles 6, or can be integral with the conduits 7 from which they receive core material 2.

As shown in FIG. 1, the conduits 7 through which the core liquid 2 flows from the manifold 8 to the core material nozzles 10 extend from the outputs 9 of the core material manifold 8 into the interior of the shell material tank 5 and approach the base of the tank 5 through the shell liquid 3 contained inside. The conduits 7 are sealed from the shell liquid 3 so that no mixing of shell and core liquids 3, 2 can occur in the tank 5.

The manifold 8 is preferably located above the tank 5 of shell liquid 3 so that core liquid 2 can flow through the conduits 7 from the core liquid manifold 8 to the core liquid nozzles 10 under gravity. For example, as shown in FIG. 1, the manifold 8 can be located directly above the shell material tank 5 and the conduits 7 can extend in a substantially downward vertical direction to the core material nozzles 10 via one or more openings in the top of the tank 5. This keeps the footprint of the apparatus 4 small.

As can be seen from FIG. 1, the shell material tank 5 may optionally comprise a first, upper section 5a and a second, lower section 5b. The first section 5a can be located directly above the second section 5b and has a greater internal volume for storing shell material 3 than the second section 5b. As explained below, the two sections 5a, 5b may be coupled together so that liquid shell material 3 can enter the second section 5b from the first section 5a via an opening or conduit between the two sections 5a, 5b. For example, an opening in the base of the first section 5a may be aligned with an opening in the top of the second section 5b so that liquid shell can flow through the two openings under gravity. The flow of liquid between the sections 5a, 5b may optionally be guided by a flexible hose 11 connected between the openings 5a, 5b. A flow restrictor may be installed at the opening in the base of the first section 5a so that the flow of shell liquid 3 between the sections 5a, 5b can be reduced or be stopped as required.

The second section 5b is moveable relative to the first section 5a. For example, the second section 5b may be connected to a vibration unit 12 which is configured to vibrate the second section 5b including the core and shell liquid nozzles 10, 6. The vibration unit 12 may comprise a cam 13 which is configured to apply the vibration to the second section 5b of the tank 5 as it rotates. The cam 13 can be connected to the second section 5b of the tank 5 via a rod 14 which is fixed to a non-central point on the cam 13 so that the rod 14 pushes and pulls the second section 5b of the tank 5 so that the tank 5 moves in a lateral, substantially horizontal plane as the cam 13 rotates. This is shown in FIG. 1. It will be understood that other types of vibration unit 12 can alternatively be used to achieve the lateral vibration in the second section 5*b* of the tank 5.

If no conduit, such as the flexible hose 11 referred to above, is used to connect the two sections 5*a*, 5*b* of the shell material tank 5, it is preferable that the opening in the top of the second section 5*b* is sufficiently larger than the opening in the base of the first section 5*a* to account for the relative movement of the two openings. This ensures that shell liquid 3 flowing out of the opening in the base of the first section 5*a* wholly enters the opening in the top of the second section 5*b* even when the position of the opening in the top of the second section 5*b* is changing during vibration of the second section 5*b*.

The plurality of conduits 7 for the core material 2 pass from the first section 5*a* of the shell material tank 5 into the second section 5*b* of the shell material tank 5 via a plurality of corresponding apertures in the base of the first section 5*a* and top of the second section 5*b*. The conduits 7 may, in this regard, optionally each comprise a first section 7*a* and a second section 7*b*. Referring to FIG. 1, the first section 7*a* of conduit 7 may extend from an output 9 of the core material manifold 8 through the first section 5*a* of the shell material tank 5 to an aperture in the base of the first section 5*a* of the shell material tank 5. From there, the second section 7*b* of conduit 7 may extend from the aperture in the base of the first section 5*a* of the shell material tank 5 to a core liquid nozzle 10 in the base of the second section 5*b* of the shell material tank 5 via an aperture in the top of the second section 5*b* of the shell material tank 5. One or more seals may be provided at the apertures to prevent leakage of the core material 2 at the joins between the conduit 7*a*, 7*b* and the first and second sections 5*a*, 5*b* of tank 5.

Figure 3:
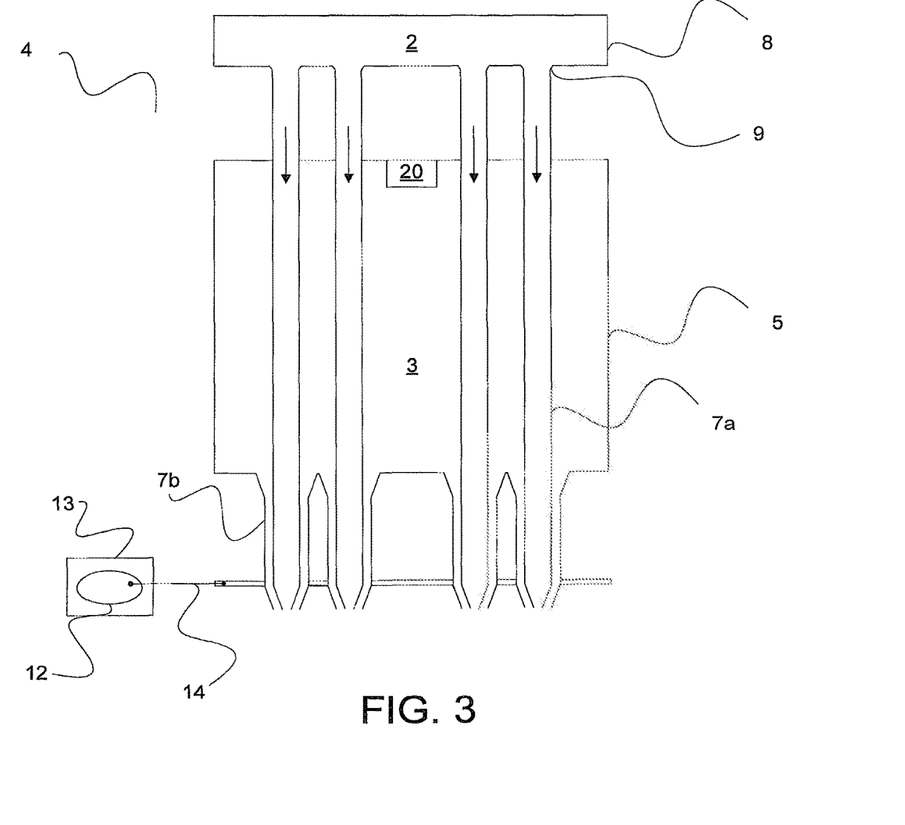
FIG. 3 is an illustration of a capsule forming apparatus in which a plurality of vibratable core and shell material nozzles are connected to storage tanks via one or more flexible hoses.

Alternatively, referring to FIG. 3, the tank 5 may comprise a single section only. The shell liquid nozzles 6 and core liquid nozzles 10 are in this case connected to the tank 5 via the second section of flexible conduit 7*b*. As shown in FIG. 3, to facilitate this, the second section of conduit 7*b* may comprise an internal tube for conveying the core material 2 from the first section 7*a* of conduit 7 to the core material nozzle 10 and an outer section of tube, co-axial with the inner section of tube, for conveying shell material 3 from the tank 5 to the shell material nozzle 6. The core and shell material nozzles 6, 10 may be fixed or mounted to a support, for example a support plate, suspended beneath the core material manifold 8 and shell material tank 5, which is connected to the cam 13 via the rod 14 so that a vibration can be applied. The vibration may be a lateral vibration of the type previously described. The tank 5 and manifold 8 are not vibrated. Therefore, due to the lower weight of the combination of support and nozzles 6, 10, less power is required to vibrate the nozzles 10, 6.

The first and second sections 7*a*, 7*b* of conduit 7 may comprise first and second regions of a single length of conduit 7. Alternatively, the first and second sections 7*a*, 7*b* of conduit 7 can comprise separate lengths of conduit 7 which are coupled together using a sealed join. Optionally the first and second sections 7*a*, 7*b* of conduit 7 may be formed from different materials or have different material properties. For example, the walls of the first section 7*a* of conduit 7 may be rigid whilst the walls of the second section 7*b* of conduit 7 are flexible to accommodate the movement of the nozzles 6, 10 relative to the tank 5 during vibration.

Figure 8:
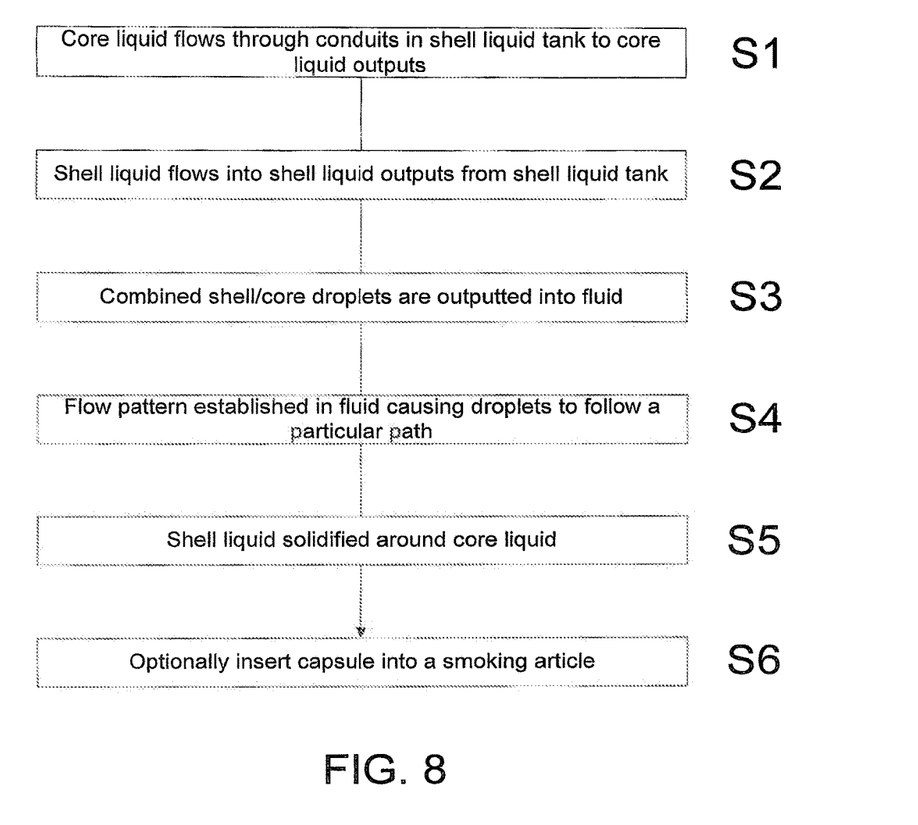
FIG. 8 is a flow diagram of a method for forming capsules.

Referring to FIG. 8, in a first stage S1 of the capsule 1 formation process, a stream of core material 2 may flow substantially continuously from the manifold 8 along the conduits 7 into the core material nozzles 10. The flow of core material 2 is shown by arrows in FIG. 1. Likewise, simultaneously in a second process S2, shell material 3 may flow substantially continuously from the tank 5 into the shell material nozzles 6.

An example of a pair of core material and shell material nozzles 10, 6 is shown in FIG. 4. As briefly referred to above, the nozzles 10, 6 are concentric. The core material nozzle 10 fits inside the shell material nozzle 6 and has smaller entry and exit diameters. The entrance of the shell material nozzle 3 is open to the shell material tank 5 so that liquid shell material 3 enters the shell material nozzle 6 from the tank 5 under gravity. Likewise, the entrance of the core material nozzle 10 is open to the second section 7*b* of conduit so that core material 2 enters the core material nozzle 10 from the conduit 7 under gravity. The flow of liquid material 2, 3 through one or both of the nozzles 6, 10 may optionally be aided by the action of one or more pumps configured to pump the liquid 2, 3 through the nozzle(s) 6, 10. The one or more pumps 20 are configured to provide extra motive force to aid with discharge of the core and/or shell material 2, 3 from the nozzle(s) 6, 10. The pump(s) 20 may, therefore, be of particular help for discharging materials 2, 3 which have a relatively high viscosity. The extra motive force provided by the pump(s) 20 may be regulated by opening and/or closing one or more control valves. For example, the control valves can be selectively opened or closed to increase or decrease the flow rate of materials 2, 3 into/out of the nozzles 6, 10. The control valves may be of particular help for materials 6, 10 which have a lower viscosity and for which the flow rate provided by the pump is undesirably high.

At the exit of the nozzles 6, 10 the core material 2 being outputted from the core material nozzle 10 and the shell material 3 being outputted from the shell material nozzle 6 combine to form a combined droplet 15 comprising an inner region of core liquid 2 surrounded by an outer layer of shell liquid 3. The formation of the combined droplet 15 is caused by the relative positions and sizes of the core and shell material nozzles 10, 6 and is aided when a vibration is applied to the nozzles 6, 10 by the vibration unit 12 referred to previously.

For example, the vibration unit 12 can be used to vibrate the nozzles 6, 10 as core and shell liquid 2, 3 move through them. Additionally or alternatively, the vibration unit 12 can be used to vibrate the second section of conduit 7*b* through which the core material 2, and optionally also the shell material 3, flows to the nozzles 6, 10. The vibration caused by the vibration unit 12 breaks up the continuous stream of core and shell material 2, 3 into droplets 15 at the nozzle exits. The frequency at which the vibration unit 12 applies a vibration is adjustable in response to user controls so that the application of the vibration can be optimized for the particular core material 2 and/or shell material 3 being used and the desired droplet size.

In a third stage S3 of the process, combined droplets 15 which have exited the pair of nozzles 6, 10 can enter a fluid 16 such as a suitable oil in which the shell material 3 is caused to solidify. The fluid 16 may be a cooling fluid configured to solidify the shell material by reducing its temperature. However, it will be appreciated that alternative, for example chemical, solidification process can take place to solidify the shell material 6 and therefore that the fluid 16 does not need to be a cooling fluid 16.

The fluid 16 is preferably immiscible or substantially immiscible with the shell and core materials 3, 2. It may comprise a suitable food-grade oil. Alternatives to oils include propylene glycol, glycerol, or other suitable food-grade material which, if used as cooling fluid 16, remains in the liquid phase at temperatures below the freezing point of the shell material 6. The central core material 2 may remain liquid, for example due its freezing temperature being lower than the temperature of the fluid 16.

Figure 5:
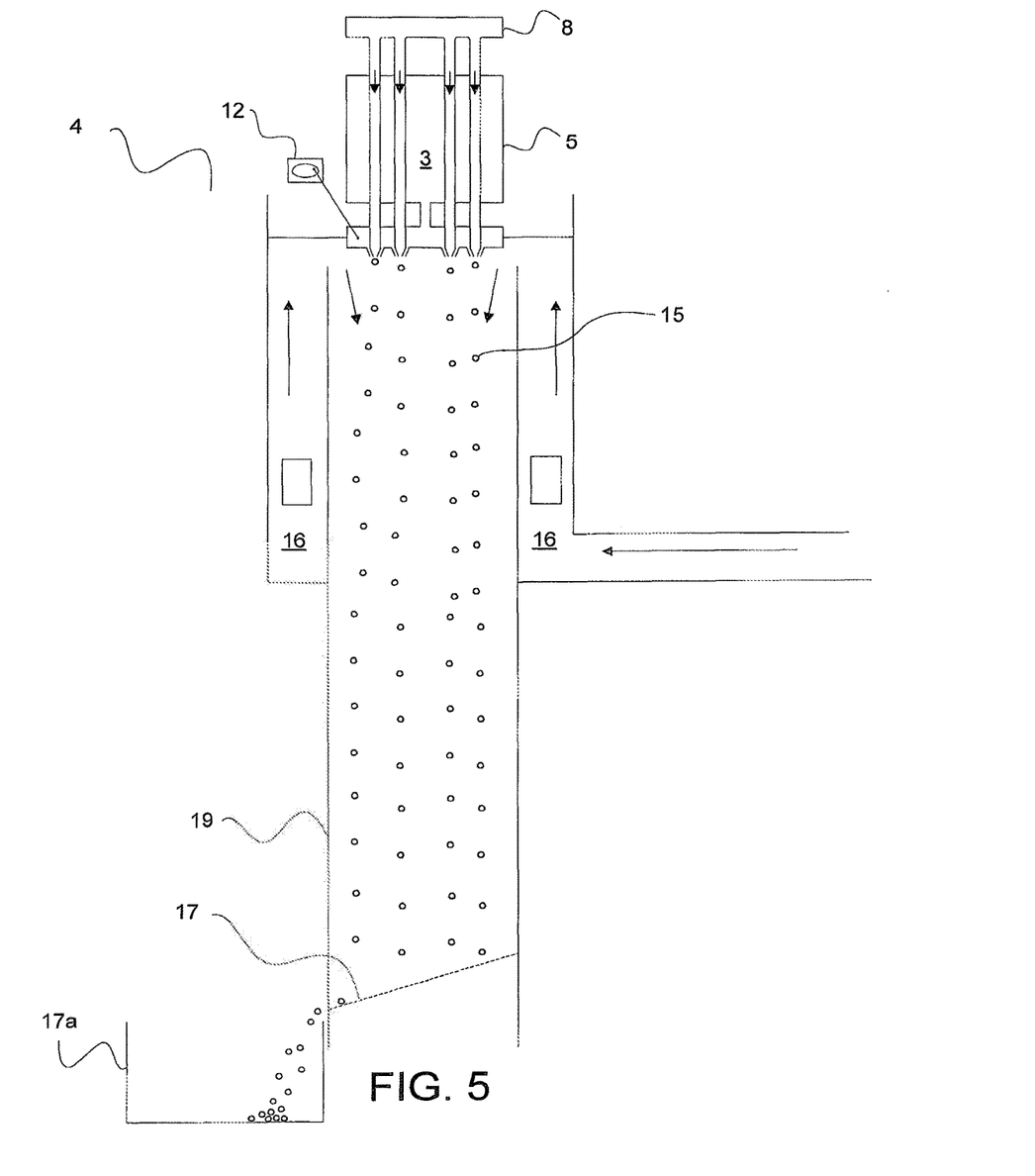
FIG. 5 is a schematic illustration of a nozzle apparatus and a fluid flow system for forming capsules. The nozzles are immersed in the fluid, which is driven longitudinally past the nozzles.
Figure 6:
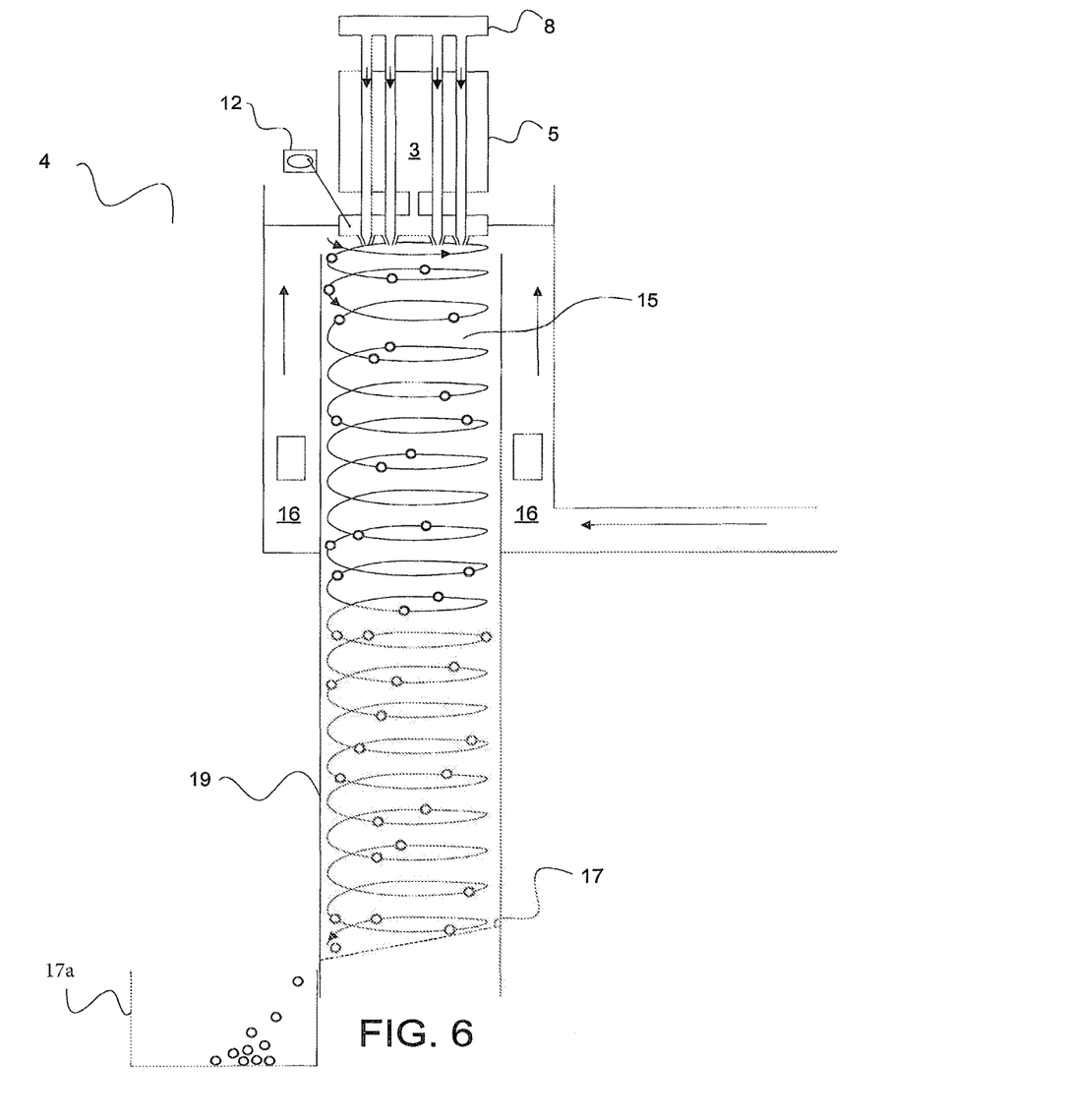
FIG. 6 is a schematic illustration of a nozzle apparatus and a fluid flow system for forming capsules. The nozzles are immersed in the fluid, which is driven so that capsules follow a spiral path in the fluid.
Figure 7:
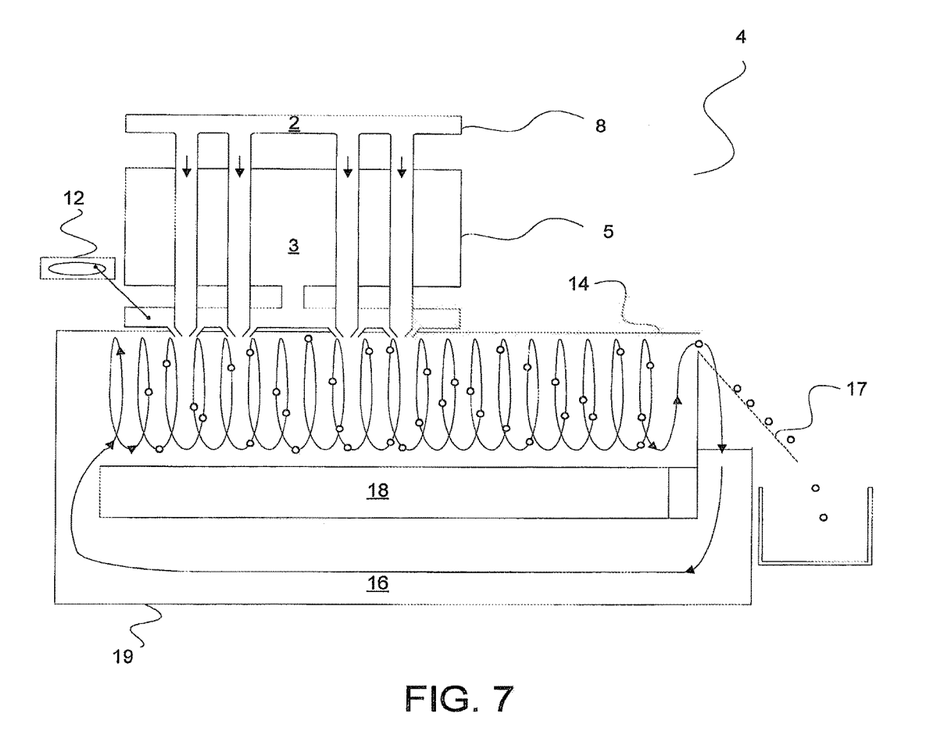
FIG. 7 is a schematic illustration of a nozzle apparatus and a fluid flow system for forming capsules. The nozzles are immersed in the fluid, which is driven so that capsules follow a spiral path in the fluid. The fluid flows in a looped circuit and is cooled by a cooling unit.

Optionally, droplets 15 exiting the nozzle pair 6, 10 can fall under gravity through a gas such as air into a fluid reservoir located below the exit of the nozzles 6, 10. Alternatively, as shown in FIGS. 5 to 7, the exit of the nozzles 6, 10 may be immersed in the fluid 16 so that droplets 15 enter the fluid 16 directly from the nozzle pair 6, 10.

In a fourth stage of the process S4, a flow pattern may be established in the fluid 16. For example, a re-circulating flow of fluid 16 may be established so that fluid 16 flows around a looped system which starts and finishes at the nozzle exits. Other types of flow pattern are also possible, as discussed further below. Baffles may be used to aid with directing the fluid 16 around the loop. Additionally or alternatively, the flow of fluid 16 may be at least partially directed by a fluid director. For example, one or more angled nozzle jets, pumps and/or paddles which are configured to eject or direct streams of the fluid 16 into the larger flow, or main body, of fluid 16 at a higher velocity than the larger flow, or main body, of fluid 16 may be used. The fluid 16 carries the droplets 15 away from the nozzle exits to a collection point. If a flow pattern is used, one or more flow restrictors may be placed in the path of the fluid 16 in order to regulate its flow. This is shown in FIGS. 5 and 6.

If a flow pattern is used, the flow of fluid 16 carries the capsules 1 to a collector 17, for example a suitably sized mesh or grating immersed in the stream of fluid 16, which collects the capsules 1 whilst allowing the fluid 16 to pass through it. The collector 17 may be angled to allow for the capsules 1 to roll down a slope into a receptacle 17a, whilst separating the fluid 16 and allowing it to re-circulate. As previously described, the fluid 16 may subsequently be driven around a looped system back to the nozzles 6, 10, from where it carries more droplets 15/capsules 1 to the collector 17 in the manner described above. This is discussed in more detail below with respect to fluid flow patterns, particularly in relation to FIG. 7. The looped system can optionally incorporate a refrigeration unit 18 which is configured to cool the fluid 16 as it re-circulates back to the nozzles 6, 10.

As referred to previously, the combined droplets 15 of core and shell material 2, 3 exiting the nozzle pairs 6, 10 take on a substantially spherical shape in the fluid 16. Therefore, as the outer layer of shell material 3 solidifies in the fluid 16 during a fifth step S5 of the process, it forms a substantially spherical shell 3 around the internal core material 2.

In its simplest form, the flow pattern may comprise a longitudinal and substantially uniform stream of fluid 16 which flows past the exit points of the nozzles 6, 10 at a substantially uniform velocity and carries the droplets 15 to the collector 17 along a relatively short and direct longitudinal path. An example is shown in FIG. 5.

A more sophisticated flow pattern comprises driving the droplets 15 along a spiral path in the fluid 16, so that the droplets 15 travel to the collector 17 along a relatively long and indirect path. An example is shown in FIGS. 6 and 7. For example, the fluid 16 can itself be driven in a spiral pattern, at least in a region between the nozzle exit and collector 17, by one or more directors such as jets, paddles and/or pumps so as to cause the droplets 15 to follow a spiral path on their way to the collector 17. The pipe or shaft 19 along which the droplets 15 are driven may be shaped so as to aid with the creation and maintenance of the spiral flow pattern in the fluid 16. By driving the droplets 15 along a spiral path towards the collector 17 rather than the direct path described above and illustrated in FIG. 5, the droplets 15 spend more time and travel a further distance in the fluid 16 for a given longitudinal distance travelled towards the collector 17 (e.g. for a given length of pipe 19). Therefore, compared to the direct, longitudinal path referred to above and shown in FIG. 5, an equivalent cooling time and distance of travel for the droplets 15 in the fluid 16 is obtained for a much shorter longitudinal distance between the nozzle exit and the collector 17. The number of droplets 15 present per unit volume of fluid 16 is also increased. As such, the size and, in particular, the footprint of an apparatus 4 using a spiral flow path can be much smaller than an apparatus 4 using a more direct flow path between the nozzle exit and collector 17. A high rate of capsule production can be attained with a small overall size of apparatus 4.

Referring to FIG. 7, the apparatus 4 includes a plurality of pairs of the nozzles 6, 10 all immersed in the same stream of re-circulating fluid 16. Thus, only a single fluid system is required to serve all nozzles 6, 10. By providing a common fluid system and/or common shell source tank, the overall size, in particular the footprint, of the apparatus 4 is reduced compared to apparatuses which do not use such common fluid and/or supply systems.

The fluid 16 may be driven in any of the flow patterns referred to above and re-circulates in a looped cycle to continuously carry droplets 15 emitted by the nozzles 6, 10 to the collector 17, hardening the shell material 3 on the way. A cooling unit 18 such as the refrigeration unit 18 referred to previously may be positioned within the loop so as to cool the fluid 16 as required during circulation. In FIG. 7, the fluid 16 is driven along a spiral path between the nozzle exits and the collector 17 thereby allowing the outer shell layer 3 of the droplets 15 to be hardened over a relatively short longitudinal distance between the nozzles 6, 10 and the collector 17. This configuration of looped system allows a reduction in the height of the apparatus 4 because the main flow of fluid 16 is in a horizontal rather than vertical direction.

Once the shell layer 3 has solidified, the shape of the body of core material 2 is defined by the shape of the solid shell 3. It is advantageous for the core material 2 to be in a liquid state for reasons that will be explained below. The capsules 1 are removed from the fluid 16 using the collector 17 described above.

A suitable shell material 3 can be a gelatine solution which gels to form a solid and frangible material. The shell material 3 is able to irreversibly change state from a liquid solution to a solid in the fluid 16. This state change can be driven, for example, by a change in the temperature of the shell material 3 in the fluid 16 or by a compound present in the fluid 16 which causes the shell material 3 to solidify. It will be appreciated that there are a variety of different gelling or encapsulating substances which could be used as the shell material 3 which, when treated, form a solid, frangible shell; for example, gelatin, sodium alginate and guar gum. The shell material 3 can be formulated to include a compound which will cause the shell material to solidify once in contact with the fluid 16. For example, the reaction of calcium ions with sodium alginates may be used. The calcium ions and sodium alginates may be contained in opposite ones of the shell material 3 and fluid 16 so that the reaction occurs upon contact.

Solidification of the shell material 3 in the fluid 16 forms a solid coating which wholly encapsulates the core material 2. The thickness of the shell 3 can be adjusted as required by increasing or reducing the amount of shell material 3 which is combined with each quantity of core material 2 at the nozzles 6, 10. The thickness of the shell 3 may impact the characteristics of the capsule 1. For example, the thickness of the shell 3 may affect how frangible the capsule 1 is.

The capsules 1 formed using the above-described process comprise a liquid, for example menthol, core 2 encapsulated by a solid, for example gelatinous, shell 3. The solid structure of the shell 3 has different physical and chemical properties compared to the liquid precursor from which it was formed. For example, once solidified around the cores 2, the solid shell 3 may be thermally stable in a temperature range of between −15 and 60 degrees Celcius. The shell 3 will also provide an impermeable barrier to the core material 2 inside the capsule 1. This prevents the core material 2 from leaking from the capsule 1, even when it is in a liquid state. The thickness and structure of the shell 3 is such that when the capsules 1 are squeezed between finger and thumb with a relatively modest amount of pressure, the shell coating 3 cracks or otherwise breaks so that the liquid core material 2 contained within the shell 3 is released. If the capsule 1 is inserted into a cellulose acetate filter of a cigarette in an optional sixth step S6, breaking the capsule causes liquid core material 2 to bleed into the fibrous filter material and thus add flavour to smoke as it is drawn through the filter from the tobacco rod.

The embodiments and alternatives described above can be used either singly or in combination to achieve the effects of the invention.

The invention claimed is:

1. A capsule forming apparatus comprising:
a plurality of droplet forming outputs configured to output capsule materials; each droplet forming output comprising a nozzle pair including a first nozzle configured to output the first capsule material and a second nozzle substantially concentric with the first nozzle configured to output the second capsule material;
a first tank for housing a first capsule material and being configured to supply the first capsule material to be output from the first nozzle of each droplet forming output;
a second tank for housing a second capsule material and being configured to supply the second capsule material to be output from the second nozzle of each droplet forming output; and
conduits configured to convey the second capsule material from the second tank to the second nozzle of each droplet forming output, each conduit being separate to each of the other conduits;
wherein said conduits extend from the second tank through the first tank to each of said second nozzles.

2. A capsule forming apparatus according to claim 1, wherein the conduits extends from a roof of the tank to a base of the tank through the first capsule material.

3. A capsule forming apparatus according to claim 1, wherein the droplet forming outputs are located directly beneath the first capsule material in the tank.

4. A capsule forming apparatus according claim 1, further comprising a vibration unit configured to vibrate the droplet forming outputs such that the droplet forming outputs move relative to the tank.

5. A capsule forming apparatus according to claim 4, wherein the droplet forming outputs are located in a base section of the tank and the vibration unit is configured to vibrate the base section of the tank such that the base section moves relative to an upper section of the tank.

6. A capsule forming apparatus according to claim 4, wherein the droplet forming outputs are located in a support beneath the tank and the vibration unit is configured to vibrate the support such that the support moves relative to the tank.

7. A capsule forming apparatus according to claim 4, wherein the at least one conduit is flexible to allow an end of the conduit to move with the droplet forming outputs as they are vibrated.

8. A capsule forming apparatus according to claim 4, wherein the vibration unit comprises a cam configured to vibrate the droplet forming outputs as the cam rotates.

9. A capsule forming apparatus according to claim 1, further comprising a fluid stream into which the droplet forming outputs are configured to output the capsule materials.

10. A capsule forming apparatus according to claim 9, comprising a fluid director configured to direct the capsule materials along a spiral path in the fluid stream.

11. A capsule forming apparatus according to claim 9, wherein the fluid stream comprises a looped system through which the fluid is driven to and from the droplet forming outputs.

12. A capsule forming apparatus according to claim 9, further comprising a cooling unit configured to cool the fluid stream to a temperature sufficiently low to solidify at least one of the capsule materials.

13. A capsule forming apparatus according to claim 1, wherein the second tank is located above the tank for housing the first capsule material.

14. A capsule forming apparatus comprising:
a plurality of droplet forming outputs configured to output capsule materials;
a first tank for housing a first capsule material and being configured to supply the first capsule material to be output from the plurality of droplet forming outputs;
a second tank for housing a second capsule material; and
conduits configured to convey a second capsule material from the second tank to each droplet forming output, each conduit being separate to each of the other conduits;
wherein said conduits extend from the second tank through the first tank to each droplet forming output, and
a looped system through which a stream of fluid is driven to and from the droplet forming outputs, the droplet forming outputs being configured to output the capsule materials into the fluid stream.

* * * * *